Dec. 15, 1925.    1,566,259

A. R. COLVIN

TIRE MOLD

Filed March 10, 1925    2 Sheets-Sheet 1

WITNESSES:
Cris Feinle.
Albert J Clark

INVENTOR.
Arthur R. Colvin,
BY
Munn & Co
ATTORNEYS.

Dec. 15, 1925.  
A. R. COLVIN  
TIRE MOLD  
Filed March 10, 1925  
1,566,259  
2 Sheets-Sheet 2
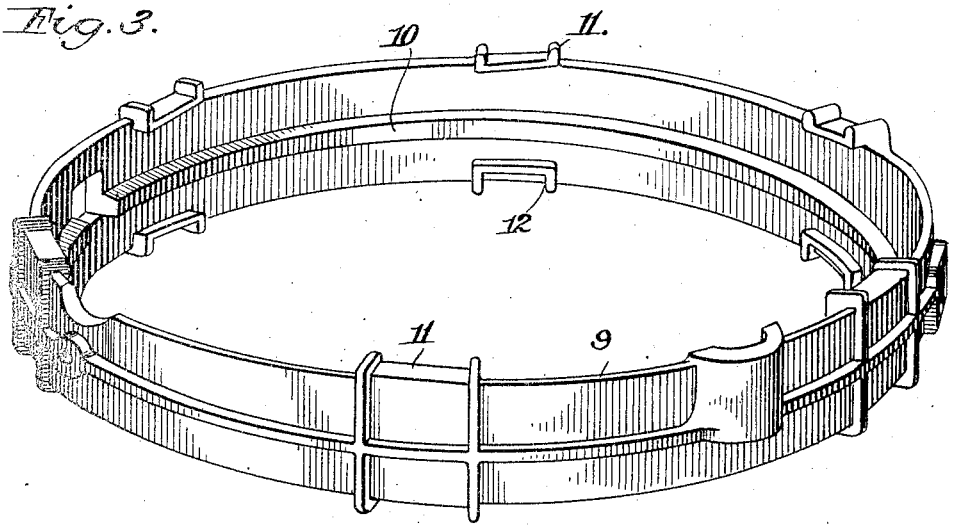
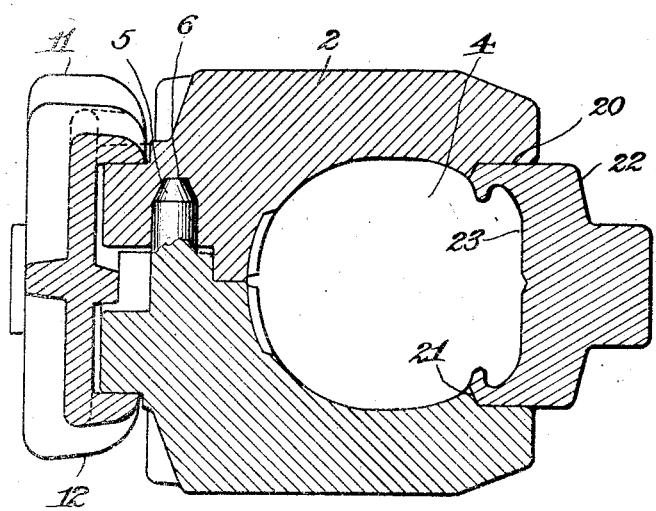
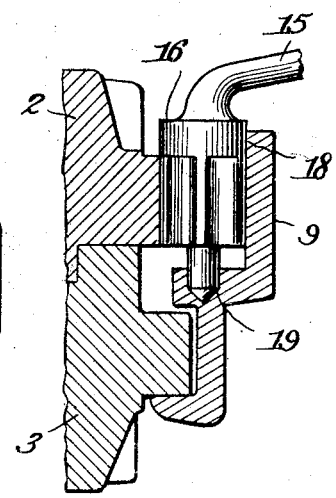
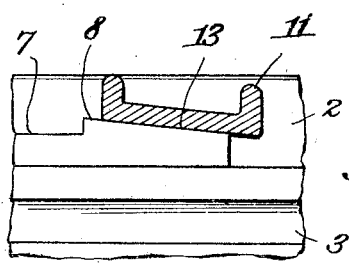
WITNESSES:  
INVENTOR,  
Arthur R. Colvin,  
BY  
ATTORNEYS.

1,566,259

Patented Dec. 15, 1925.

UNITED STATES PATENT OFFICE.

ARTHUR REID COLVIN, OF BLOOMFIELD, NEW JERSEY.

TIRE MOLD.

Application filed March 10, 1925. Serial No. 14,509.

*To all whom it may concern:*

Be it known that I, ARTHUR R. COLVIN, a citizen of the United States, and a resident of Bloomfield, in the county of Essex and State of New Jersey, have invented a certain new and Improved Tire Mold, of which the following is a full, clear, and exact description.

The present invention relates to molds for vulcanizing pneumatic tires by what is known as the "air bag process" and has for an object to provide a mold which may be assembled and disassembled by a minimum number of operations, and with means for readily locking and unlocking the same.

The usual tire mold now used in the air bag process is adapted to be held together by a plurality of bolts positioned about the periphery of the mold, which have to be placed in position and tightened by hand before the air bag positioned within the tire forming the core is inflated. Sometimes the molds are placed in a vulcanizer one upon another, with hydraulic means for holding the mold sections together. This method requires connections from outside of the vulcanizer, to each mold, to provide means for inflating the air bag after the hydraulic pressure has been applied.

The present invention, therefore, has for an object to provide a mold which may be disassembled and reassembled as quickly as possible, without the use of bolts or hydraulic pressure, for holding the sections together. To accomplish this the present invention provides a mold with a continuous locking ring adapted to be positioned about the peripheries of the mold sections.

Another object in view is to provide a locking ring which is seated when in unlocked position, on the lower section, whereby the mold may be disassembled without removing the ring.

Still another object in view is to provide novel means for rotating the ring into locked and unlocked positions.

The accompanying drawings illustrate the invention, in which—

Figure 3 is a perspective view of the locking ring;

Figure 4 is a cross sectional view on the line 1—1 of Figure 1;

Figure 5 is a partial sectional view on the line 2—2 of Figure 1; and

Figure 6 is a view in elevation of a portion of the top and bottom mold sections showing a sectional view of one of the flanges.

Figure 1:
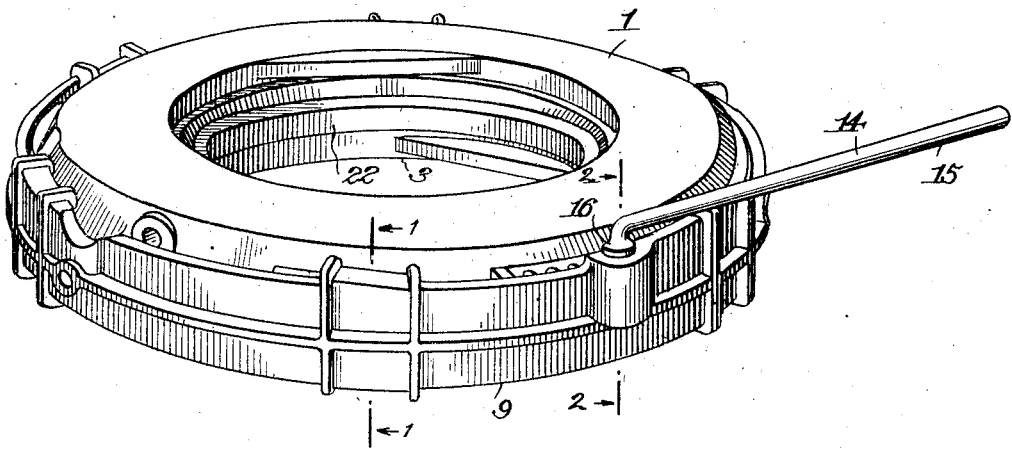
Figure 1 is a perspective view of the assembled mold.
Figure 2:
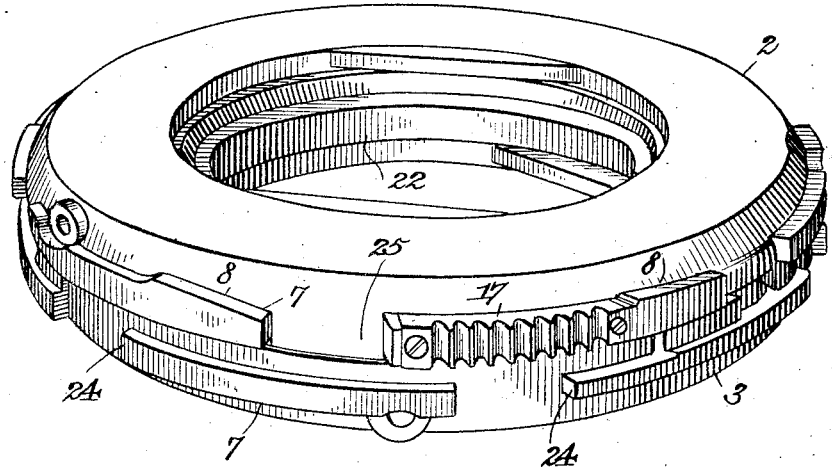
Figure 2 is a perspective view of the mold with the locking ring removed.

Referring to the drawings illustrating the invention, 1 indicates a tire mold parted at its annular median line to form upper and lower mold sections 2 and 3 respectively and provided with an annular, interior cavity 4 for the reception of a tire to be vulcanized. The lower mold section 3 is provided with dowel pins 5 which fit into openings 6 in the upper section for the purpose of holding the sections in alinement. The upper and lower sections are both provided with a series of equally spaced, outwardly extending projections 7 on their peripheries, the projections on the upper section being tapered at 8 and offset or staggered with reference to the projections on the lower section when the sections are mated.

The two sections are adapted to be locked together by means of an annular ring 9 positioned about their peripheries as shown in Figure 1. This ring is provided with an inwardly-extending annular bead 10 which is adapted to seat on the projections 7 of the lower section. A series of equally spaced, inwardly extending flanges or lugs 11 and 12 is provided about the upper and lower annular edges of the ring respectively. The flanges or lugs 11 and 12 about the upper and lower annular edges are in vertical alinement, the flanges 11 being tapered as at 13 to effect a wedging action with the tapered surfaces 8 of the projections 7.

This wedging action is effected by moving the ring 9 circumferentially about the mold sections 2 and 3 until the flanges 11 impinge on the tapered surfaces 8. To rotate the ring 9 in this manner a crank 14 is provided which comprises a handle member 15 and a pinion 16 which travels on a rack 17 provided on one of the projections 7 of the section 2 by a turning of the handle member 15. It will be understood that turning the handle member 15 in one direction will cause the ring to travel with the pinion in one direction, while turning the handle in the opposite direction will cause the pinion and ring to travel in the reverse direction. The crank 14 may be lifted out of the bearings 18 and 19 so that before the mold is placed in the heater for vulcanizing the tire the crank is removed whereby it remains cool and may be readily grasped to unlock the mold when it is removed from the heater.

The sections 2 and 3 have complementary recesses 20 and 21 respectively, to receive therebetween an annular mold section or ring 22. This section forms a seat for the air bag and is provided with a recess 23 to receive the tire beads thereby co-operating with the sections 2 and 3 to form the vulcanizing chamber 4.

To assemble the mold the ring 9 is first applied to the bottom section, the flanges 12 about its lower annular edge passing through the openings 24 between the outwardly extending projections 7 until the annular bead 10 is seated on the projections 7. The ring 9 is then rotated by hand until the flanges 12 pass under the projections 7 so that when the section 2 is positioned on the lower section 3 the dowel pins 5 thereof will enter the openings 6 at the same time that the flanges 11 pass through the openings 25 between the projections 7 on the upper section. Before applying the upper section, however, the green tire having the air bag partly inflated therewithin is assembled on the annular mold section or ring 22. The mold section 22 together with the tire is then placed in position on the lower section. The upper section is then placed in position as hereinbefore described. The crank 14 is then placed in position in the bearings 18 and 19 and turned until the flanges 11 impinge on the top surfaces 8.

It will be understood that the bead 8 prevents the ring 9 from dropping when the section 2 is removed. This construction has the advantage that it is not necessary to remove the ring 9 to disassemble the mold.

I claim:

1. A tire mold comprising upper and lower mold sections, an annular section forming therewith an interior cavity for the reception of a tire to be vulcanized, said upper and lower sections being provided on their peripheral faces with equally spaced, outwardly extending projections, the projections on the upper section being arranged in superposed and staggered relation with reference to the projections on the lower section when the sections are mated, and an annular ring fitting circumferentially about the said upper and lower sections and adapted to engage said projections to lock the sections together.

2. A tire mold comprising upper and lower mold sections, an annular section, said sections providing, when mated, an interior cavity for the reception of a tire to be vulcanized, an annular ring adapted to fit circumferentially about the said upper and lower sections, being provided with an inwardly extending annular bead, means on said lower section providing a seat for the said bead, and co-operating means on said ring and said upper and lower sections, for locking the sections together.

3. A tire mold comprising upper and lower mold sections, an annular section which when mated with the said upper and lower sections provides an interior cavity for the reception of a tire to be vulcanized, the upper and lower sections having formed on their peripheral faces equally spaced, outwardly extending projections, a ring member adapted to fit circumferentially about said upper and lower sections, which is provided with an inwardly extending bead adapted to seat on the projections on said lower section, and which is also provided with inwardly extending flanges adapted to engage the projections on the said upper and lower sections, for locking the sections together.

4. A tire mold comprising upper and lower mold sections, an annular section forming therewith an interior cavity for the reception of a tire to be vulcanized, said upper and lower sections being provided on their peripheral faces with equally spaced outwardly extending projections, the projections on the upper section being staggered with reference to the projections on the lower section, a ring member adapted to fit circumferentially about the said upper and lower sections and being provided with an inwardly extending bead adapted to seat on the projections of the lower section and having inwardly extending flanges adapted to engage projections of the said upper and lower sections for locking the sections together.

5. A tire mold comprising upper and lower mold sections, an annular section forming, when mated with said upper and lower sections, an interior cavity for the reception of a tire to be vulcanized, a ring member adapted to fit circumferentially about the said sections, co-operating means on said ring and said lower section for seating the ring on said lower section when in unlocked condition, means on said ring and upper and lower sections for locking the sections together, and means engageable with said ring and one of said sections for turning said ring circumferentially about the sections.

6. A tire mold comprising upper and lower sections, an annular section forming when mated with said upper and lower sections an interior cavity for the reception of a tire to be vulcanized, a ring member adapted to fit circumferentially about the said upper and lower sections and to seat on the lower section thereof, means on said ring and upper and lower sections for locking the sections together, and means engageable with said ring and one of said sections for turning said ring circumferentially about the sections to lock the same together.

7. A tire mold comprising upper and lower mold sections, an anuular section forming therewith an interior cavity for the reception of a tire to be vulcanized, a ring member adapted to be moved circumferentially about the said upper and lower sections to lock the sections together, and means engageable with said ring and one of said sections for turning said ring about the sections.

ARTHUR REID COLVIN.